United States Patent
Katsura et al.

(10) Patent No.: US 6,478,476 B1
(45) Date of Patent: Nov. 12, 2002

(54) PART FOR POSITIONING OPTICAL FIBER (75) Inventors: Hiroshi Katsura, Yokohama (JP);
Wataru Sakurai, Yokohama (JP);
Toshiaki Kakii, Yokohama (JP);
Masahiro Shibata, Yokohama (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 0 days.

(21) Appl. No.: 09/445,720

(22) PCT Filed: Apr. 9, 1999

(86) PCT No.: PCT/JP99/01910
§ 371 (c)(1),
(2), (4) Date: Dec. 10, 1999

(87) PCT Pub. No.: WO99/53352
PCT Pub. Date: Oct. 21, 1999

(30) Foreign Application Priority Data

Apr. 13, 1998 (JP) .......... 10-101351

(51) Int. Cl.$^7$ .......... G02B 6/36
(52) U.S. Cl. .......... 385/78; 385/60; 385/72; 523/217; 524/493; 524/494
(58) Field of Search .......... 385/60, 72, 78, 385/61–62, 81; 524/492–494, 609; 523/216, 217

(56) References Cited

U.S. PATENT DOCUMENTS

| | | | | |
|---|---|---|---|---|
| 5,200,271 A | | 4/1993 | Kosaka | 428/457 |
| 5,409,996 A | | 4/1995 | Shinohara et al. | 525/189 |
| 5,610,219 A | * | 3/1997 | Takatani et al. | 524/413 |
| 5,741,446 A | * | 4/1998 | Tahara et al. | 249/115 |
| 5,945,775 A | * | 8/1999 | Ikeda et al. | 313/110 |
| 6,142,677 A | * | 11/2000 | Sato et al. | 385/72 |
| 6,340,247 B1 | * | 1/2002 | Sakurai et al. | 385/60 |
| 6,347,890 B2 | * | 2/2002 | Ueno et al. | 264/1.25 |

FOREIGN PATENT DOCUMENTS

| | | |
|---|---|---|
| DE | 19746189 A1 | 5/1998 |
| EP | 0293116 A2 | 11/1988 |
| EP | 5-239353 | 9/1993 |
| EP | 0704486 A1 | 4/1996 |
| EP | 0 704 486 | 4/1996 |
| EP | 0798581 A1 | 10/1997 |
| JP | 6-299072 | 10/1994 |
| JP | 6-300940 | 10/1994 |
| JP | 5-345328 | 12/1995 |
| JP | 8-151519 | 6/1996 |
| WO | 95/25770 | 9/1995 |

OTHER PUBLICATIONS

European Search Report dated Nov. 24, 2000.

* cited by examiner

Primary Examiner—Hemang Sanghavi
Assistant Examiner—Omar Rojas
(74) Attorney, Agent, or Firm—MCDermott, Will & Emery

(57) ABSTRACT

The present invention relates to an optical fiber positioning member, such as a ferrule, used for optically coupling optical fibers to each other. The object of the present invention is to provide an optical fiber positioning member having practically sufficient mechanical strength and long-term durability, while maintaining high dimensional precision and dimensional stability. The optical fiber positioning member of the present invention comprises a resin composition containing a polyphenylene sulfide resin at a ratio in the range of 15% to 35% by weight, silica particles at a ratio in the range of 45% to 65% by weight, and silicate whiskers at a ratio in the range of 26% to 35% by weight, the resin composition containing the silica particles and the silicate whiskers at a ratio in the range of 65% to 85% by weight.

29 Claims, 2 Drawing Sheets

PART FOR POSITIONING OPTICAL FIBER

TECHNICAL FIELD

The present invention relates to an optical fiber positioning member used for optically coupling optical fibers to each other.

BACKGROUND ART

For connecting optical fibers to each other in the optical communication, an optical connector is usually employed, whereas optical fiber positioning members such as a ferrule and a sleeve are used in the optical connector. These optical fiber positioning members are required to have a high dimensional precision for positioning the axial centers of optical fibers with respect to each other with a high accuracy, and also to have a high dimensional stability when they are to be used over a long period of time. At the same time, since the optical fiber positioning members are repeatedly attached and detached, they require not only a sufficient mechanical strength but also a long-term durability.

Meanwhile, as optical fiber positioning members in optical connectors, ferrules made of zirconia and the like have conventionally been known. Also, ferrules in which optical fiber positioning members are obtained by transfer-molding an epoxy resin, which is a thermosetting resin, have been known. However, the ferrules made of zirconia are less advantageous than ferrules made of plastics in terms of cost, whereas it takes time for ferrules molded of thermosetting resins to cure at the time of molding, thereby lowering their productivity.

Hence, the use of thermoplastic resins which yield favorable productivity and are inexpensive has been under consideration. Known thermoplastic resins, however, are problematic in that their injection pressure at the time of molding is high, their shrinkage is large, and so forth, whereby it is not easy for practical high-precision ferrules to be obtained therefrom. Under such circumstances, techniques yielding practical ferrules have recently been reported. For example, Japanese Patent Application Laid-Open No. HEI 5-345328 discloses a ferrule in which a resin composition mainly composed of a polyphenylene sulfide resin is filled with silica particles having an indefinite or spherical form.

Also, Domestic Republication of PCT International Publication WO95/25770 discloses a ferrule in which a resin composition containing a polyphenylene sulfide resin or the like at a ratio in the range of 20% to 40% by weight is filled with spherical fine silica particles or the like at a ratio in the range of 40% to 60% by weight, and whiskers such as potassium titanate whiskers, aluminum borate whiskers, silicon carbide whiskers, silicon nitride whiskers, zinc oxide whiskers, alumina whiskers, graphite whiskers, or the like.

DISCLOSURE OF THE INVENTION

As a result of diligent studies concerning the conventional ferrules mentioned above, the inventors have found that, though the above-mentioned ferrules are advantageous in their dimensional precision and dimensional stability since the silica particles and/or whiskers are contained in the resin composition, they have problems as follows.

Namely, in the ferrule in which a resin composition is filled with silica particles, the aspect ratios of silica particles are small, whereby their reinforcing effect is insufficient. As a consequence, in an MT optical connector of a type using a guide pin, the strength of the ferrule around the guide hole for inserting the guide pin may become so weak that a part of the ferrule around the guide hole may chip off when ferrules are connected to each other by means of a clip. In particular, when a high-speed automatic switching apparatus for mechanically connecting MT optical connectors at a high speed is employed, the ferrules are prone to damage.

Also, in the ferrule in which a resin composition containing a polyphenylene sulfide resin or the like is filled with spherical fine particles and whiskers, the strength of the ferrule around the guide hole for inserting a guide pin may not be sufficient, thus causing a part of the ferrule to chip off around the guide hole when the guide pin is inserted into or pulled out from the guide hole. In an MPO optical connector of a push-on/pull-off type, in particular, since a guide pin may be inserted into the guide hole of the ferrule in an impacting fashion while being shifted or tilted, peripheral portions of the guide hole of the ferrule are apt to chip off. As a consequence, the ferrule may necessitate replacement or the like at a relatively early stage, and may not endure a long-term use.

In view of the foregoing circumstances, it is an object of the present invention to provide an optical fiber positioning member having practically sufficient mechanical strength and long-term durability while maintaining high dimensional precision and dimensional stability.

As a result of diligent studies for achieving the above-mentioned object, the inventors have found that, when a resin composition containing a polyphenylene sulfide resin further contains a specific amount of whiskers made of a specific material in addition to silica particles, the mechanical strength of the optical fiber positioning member can be improved in particular, which is advantageous in terms of long-term durability, thus accomplishing the present invention.

Namely, the optical fiber positioning member in accordance with the present invention comprises a resin composition containing a polyphenylene sulfide resin at a ratio in the range of 15% to 35% by weight, silica particles at a ratio in the range of 45% to 65% by weight, and silicate whiskers at a ratio in the range of 26% to 35% by weight, the resin composition containing the silica particles and the silicate whiskers at a ratio in the range of 65% to 85% by weight.

In the optical fiber positioning member of the present invention, as the silicate whiskers are contained in the resin composition, the mechanical strength becomes higher than that in the cases where other kinds of whiskers are contained therein. However, the mechanical strength of the optical fiber positioning member will be insufficient if the silicate whisker content is less than 26% by weight, whereas anisotropy will occur and thereby the dimensional precision will lower if the content exceeds 35% by weight. The moldability will deteriorate and the dimensional precision will lower if the polyphenylene sulfide resin content is less than 15% by weight, whereas the reinforcing effects of silica particles, whiskers, and the like upon the polyphenylene sulfide resin will be so small that the mechanical strength of the optical fiber positioning member will lower if the content exceeds 35% by weight. Also, the coefficient of linear expansion and anisotropy will become so high that the dimensional precision will lower if the silica particle content is less than 45% by weight; whereas the dimensional precision will lower if the silica particle content exceeds 65% by weight, since the fluidity of the resin composition at the time of molding decreases and thereby deteriorates the moldability. Also, since the ratio of polyphenylene sulfide resin decreases, the optical fiber positioning member becomes brittle. Further, the dimensional precision of the optical fiber positioning member will lower if the total content of the silica particles and silicate whiskers is less than 65% by weight; whereas, if the total content exceeds 85% by weight, the fluidity of the resin composition at the time of molding will worsen, so as to deteriorate the moldability, thereby lowering the dimensional precision, and the mechanical strength will be insufficient.

Also, the optical fiber positioning member of the present invention comprises a resin composition containing a polyphenylene sulfide resin, silica particles, and a plurality of kinds of whiskers, the resin composition containing the silica particles and the whiskers at a ratio in the range of 65% to 85% by weight.

In the optical fiber positioning member of the present invention, as a plurality of kinds of whiskers are used, the whiskers having different forms and ingredients would be mixed together. As a consequence, the anisotropy of the resin composition is canceled, whereby the dimensional precision would improve. Also, in the optical fiber positioning member of the present invention, the dimensional precision of the optical fiber positioning member will lower if the total content of the silica particles and whiskers is less than 65% by weight; whereas, if the total content exceeds 85% by weight, the fluidity of the resin composition at the time of molding will worsen, so as to deteriorate the moldability, thereby lowering the dimensional precision, and the mechanical strength will be insufficient.

Further, the optical fiber positioning member of the present invention comprises a resin composition containing a polyphenylene sulfide resin mainly composed of a linear type polyphenylene sulfide resin at a ratio in the range of 22% to 35% by weight, silica particles at a ratio in the range of 45% to 65% by weight, and silicate whiskers at a ratio in the range of 3% to 13% by weight, the resin composition containing the silica particles and the silicate whiskers at a ratio in the range of 58% to 78% by weight.

In the optical fiber positioning member of the present invention, as the linear type polyphenylene sulfide resin is used as a main ingredient of the polyphenylene sulfide resin, the molecular weight of the polyphenylene sulfide resin increases, thereby further enhancing the mechanical strength of the optical fiber positioning member. The moldability will worsen and the dimensional precision will lower if the polyphenylene sulfide resin content in the resin composition is less than 22% by weight, whereas the reinforcing effects of silica particles, whiskers, and the like upon the polyphenylene sulfide resin will be so small that the mechanical strength of the optical fiber positioning member will lower if the content exceeds 35% by weight. Also, the coefficient of linear expansion and anisotropy will become so high that the dimensional precision will lower if the silica particle content is less than 45% by weight; whereas the dimensional precision will lower if the silica particle content exceeds 65% by weight, since the fluidity of the resin composition at the time of molding decreases and thereby deteriorates the moldability. Also, since the ratio of polyphenylene sulfide resin decreases, the optical fiber positioning member becomes brittle. The reinforcing effects due to the silicate whiskers will be small and the mechanical strength will lower if the silicate whisker content in the resin composition is less than 3% by weight; whereas, if the content exceeds 13% by weight, the silicate whiskers will increase and, since polyphenylene sulfide contains the linear type polyphenylene sulfide resin, which is a high molecular weight ingredient, the fluidity of the resin composition at the time of molding will lower, thereby decreasing the dimensional precision and the mechanical strength. Also, the dimensional precision of the optical fiber positioning member will lower if the total content of the silica particles and silicate whiskers is less than 58% by weight; whereas, if the total content exceeds 78% by weight, the fluidity of the resin composition at the time of molding will worsen, so as to deteriorate the moldability, thereby lowering the dimensional precision, and the mechanical strength will be insufficient.

BEST MODE FOR CARRYING OUT THE INVENTION

In the following, the optical fiber positioning member of the present invention will be explained in detail with reference to the accompanying drawings.

The optical fiber positioning member of the present invention is characterized in that it comprises a resin composition containing a polyphenylene sulfide resin (hereinafter referred to as "PPS resin"), silica particles, and whiskers. Here, the PPS resin is used since it is advantageous in terms of dimensional stability, creep characteristic, and moldability. In general, PPS resins encompass crosslink type (branched type) PPS resins and linear type PPS resins. Usually, the PPS resin used in the present invention is mainly composed of a crosslink type PPS resin. Here, the crosslink type PPS resin content in the PPS resin is usually 70% to 100% by weight. A PPS resin having a melt viscosity of 1000 to 20000 poises at 320° C. is preferable so that the silica particles and whiskers can be compounded at a high filling ratio. Also, the PPS resin content in the resin composition is usually 15% to 35% by weight. If it is less than 15% by weight, there will be a tendency of the moldability to worsen and the dimensional precision to lower; whereas, if it exceeds 35% by weight, there will be a tendency of the reinforcing effects of the fillers (silica particles and whiskers) upon the PPS resin to decrease and the mechanical strength of the optical fiber positioning member to lower.

The silica particles used in the optical fiber positioning member of the present invention are contained in the resin composition since the silica particles have a low coefficient of linear expansion and low anisotropy, whereby the dimensional precision of the optical fiber positioning member can be improved. The average particle size of the silica particles is preferably 0.2 to 6 μm. It is due to the fact that, if the average particle size is less than 0.2 μm, there will be a tendency of the resin composition to decrease its fluidity at the time of molding, thereby making its molding unstable and lowering the dimensional precision; whereas, if the average particle size exceeds 6 μm, there will be a tendency of irregularities on the order of microns to occur when the silica particles deposit on the surface.

The silica particles usually have a particle size distribution with one relative maximum value. The particle size corresponding to this one relative maximum value preferably lies within the range of 0.3 to 0.9 μm. If the particle size corresponding to the relative maximum value is less than 0.3 μm, there will be a tendency of the moldability to worsen. If the particle size of the silica particles corresponding to the relative maximum value exceeds 0.9 μm, on the other hand, there will be a tendency of the resin composition to decrease its mechanical strength when compared at the same filling amount. In MPO connectors, it is necessary for the optical fibers at connector end faces to come into physical contact (PC connection) with each other at the time of coupling the connectors. For this purpose, the end face of the optical fiber has to be projected from the end face of the ferrule, and the end face of the optical fiber is subjected to special grinding. The amount of projection of the optical fiber at the time of grinding largely depends on the fillers contained in the resin composition, such as the silica particles in particular. Namely, under the same grinding condition, the amount of projection tends to become greater as the particle size of the silica particles is smaller, thus facilitating the PC connection. In the case where the particle size corresponding to the relative maximum value of the particle size distribution of silica particles lies within the range of 0.3 to 0.9 μm in particular, the amount of projection of the optical fiber can further be increased, whereby the dimensional precision and the mechanical strength will be higher.

Preferably, the silica particles comprise a mixture of a plurality of silica particles having different particle size distributions, thus yielding a plurality of relative maximum values in the particle size distribution of this mixture, in which the ratio of particle sizes (larger particle size/smaller particle size) corresponding to the two largest relative maximum values is 4 to 40. The particle size ratio within this range is advantageous in that silica particles having a smaller particle size enter the gap between silica particles having a larger particle size, thereby improving the filling ratio and, when compared at the same filling ratio, it tends to improve the fluidity of the resin composition since the contact resistance between the silica particles is reduced.

Also, when the silica particles have a plurality of relative maximum values in their particle size distribution, the weight ratio of the silica particles (weight of silica particles having a larger particle size/weight of silica particles having a smaller particle size) indicating the two largest relative maximum values is preferably 1 to 1.9. If this ratio is less than 1, there will be a tendency of the resin composition to worsen its fluidity at the time of molding and the dimensional precision to lower when the ratio of silica particles having a larger particle size is small while the filling amount of silica particles in the resin composition is large; whereas, if it exceeds 1.9, it will tend to become difficult for the silica particles to attain a high filling ratio, and the ratio of silica particles having a smaller particle size will tend to decrease, whereby the mechanical strength of the optical fiber positioning member will lower.

Preferably, the silica particles are constituted by a mixture of silica particles having different forms. When the silica particles are thus constituted by a mixture of silica particles having different forms, the mechanical strength of the optical fiber positioning member tends to improve. Examples of the silica particles include silica particles in a crushed form obtained by crushing glass fibers, spherical silica particles obtained by melting silica particles having a crushed form in a flame so as to make it attain a spherical form due to a surface tension, and the like. When the silica particles are constituted by a mixture of spherical silica particles and silica particles having a crushed form, the spherical silica particle content in the resin composition is usually 20% to 40% by weight. If the spherical silica particle content is less than 20% by weight, there will be a tendency of the moldability to worsen and the dimensional precision to lower; whereas, if it exceeds 40% by weight, the effects of mixing the silica particles having a crushed form will tend to be so small that the mechanical strength of the optical fiber positioning member may not improve. On the other hand, the content of the silica particles having a crushed form is usually 5% to 25% by weight. If the content of the silica particles having a crushed form is less than 5% by weight, there will be a tendency of the mechanical strength to fail to improve; whereas, if it exceeds 25% by weight, the flow resistance will tend to increase at the time of molding, so as to deteriorate the moldability, thereby lowering the dimensional precision.

The silica particle content in the resin composition used in the present invention is 45% to 65% by weight. If the silica particle content is less than 45% by weight, the anisotropy will increase, thereby lowering the dimensional precision; whereas, if the silica particle content exceeds 65% by weight, the fluidity of the resin composition at the time of molding will lower, so as to deteriorate its moldability, whereby the dimensional precision of the optical fiber positioning member will lower. Also, since the ratio of the PPS resin decreases, the optical fiber positioning member becomes brittle.

The whiskers contained in the resin composition employed in the present invention are silicate whiskers. The silicate whiskers are employed due to the fact that they have a favorable dimensional stability because of their low coefficient of thermal expansion, and, since their surface is inactive, the viscosity does not increase even if the filling amount is increased, and their reinforcing effect is high. Consequently, they can improve the dimensional precision and mechanical strength of the optical fiber positioning member.

Examples of the silicate whiskers include calcium silicate whiskers and potassium silicate whiskers. Preferably, these silicate whiskers have an average fiber length of 3 to 50 μm. If the average fiber length is less than 3 μm, the reinforcing effects upon the PPS resin will tend to decrease; whereas, if the average fiber length exceeds 50 μm, anisotropy will appear, thereby yielding a tendency of the dimensional precision to lower. It is also preferred that the average diameter of the silicate whiskers be 1 to 10 μm. If the average diameter is less than 1 μm, there will be a tendency of a high-ratio filling into the resin to become difficult and the dimensional precision to lower; whereas, if the average diameter exceeds 10 μm, irregularities tend to appear when the silicate whiskers deposit on the surface of the optical fiber positioning member, thereby lowering the dimensional precision. Further, it is preferred that the aspect ratio of the silicate whiskers (average length/average diameter) be 3 to 10. If the aspect ratio is less than 3, the reinforcing effects upon the PPS resin will tend to become insufficient; whereas, if the aspect ratio exceeds 10, there will be a tendency of the anisotropy to increase and the dimensional precision to lower.

The silicate whisker content in the resin composition is 26% by weight or greater. If the silicate whisker content is less than 26% by weight, the mechanical strength of the optical fiber positioning member will be insufficient. On the other hand, the silicate whisker content in the resin composition is 35% by weight or less. If it exceeds 35% by weight, anisotropy occurs in the optical fiber positioning member, thereby lowering the dimensional precision. Further, the total content of the silica particles and silicate whiskers in the resin composition is 65% to 85% by weight. If the total content is less than 65% by weight, the dimensional precision of the optical fiber positioning member will lower; whereas, if the total content exceeds 85% by weight, the fluidity of the resin composition at the time of molding will worsen, so as to deteriorate the moldability, thereby lowering the dimensional precision, while making the mechanical strength insufficient.

The whiskers contained in the resin composition used in the present invention are a mixture of a plurality of kinds of whiskers. When a plurality of kinds of whiskers are used, the whiskers having different forms and ingredients would be mixed together, whereby the anisotropy of the resin composition is canceled, and the dimensional precision is improved. In particular, the mixture of a plurality of kinds of whiskers is preferably a mixture of silicate whiskers and zinc oxide whiskers. In this case, since the zinc oxide whiskers are formed like a tetrapod, while having a small size per se and a low anisotropy, the anisotropy of the resin composition caused by the silicate whiskers is canceled, and the dimensional precision of the optical fiber positioning member tends to improve.

In this case, the silicate whisker content in the resin composition is usually 5% to 30% by weight, preferably 15% to 30% by weight. If the silicate whisker content is less than 5% by weight, the reinforcing effects of the silicate whiskers upon the PPS resin will tend to decrease; whereas, if it exceeds 30% by weight, there will be a tendency of the resin composition to increase its anisotropy and the optical fiber positioning member to lower its dimensional precision. Also, the zinc oxide whisker content in the resin composition is usually 5% to 30% by weight, preferably 5% to 20% by weight. If the zinc oxide whisker content is less than 5% by weight, the effects of combining the whiskers will fail to appear, whereby the anisotropy reducing effects will tend to lower; whereas, if it exceeds 30% by weight, the reinforcing effects upon the PPS resin will tend to decrease, thus lowering the mechanical strength of the optical fiber positioning member.

Further, the whisker mixture content in the resin composition is 26% by weight or greater. If the whisker mixture content is less than 26% by weight, the mechanical strength of the optical fiber positioning member will be insufficient. On the other hand, the whisker mixture content in the resin composition is 35% by weight or less. If it exceeds 35% by weight, anisotropy will occur in the optical fiber positioning member, thereby lowering the dimensional precision.

The PPS used in the present invention can be mainly composed of a linear type PPS resin. In this case, the PPS resin is contained at a ratio in the range of 22% to 35% by weight in the resin composition. If it is less than 22% by weight, the moldability will worsen, thereby lowering the dimensional precision; whereas, if it exceeds 35% by weight, the reinforcing effects of the silica particles, whiskers, and the like upon the PPS resin will become smaller, thereby lowering the mechanical strength of the optical fiber positioning member. The PPS resin is a mixed resin of a linear type PPS resin and a crosslink type or branched type PPS resin. The linear type PPS resin is used as a main ingredient since it increases the molecular weight of the PPS resin and further improves the mechanical strength of the optical fiber positioning member. The linear type PPS resin is contained in the PPS resin usually by 60% to 100% by weight, preferably by 80% to 100% by weight. If the linear type PPS resin is less than 60% by weight, the molecular weight of the PPS resin will tend to be small, thereby lowering the mechanical strength. The PPS resin usually has a melt viscosity of 1000 to 20,000 poises at 320° C.

When a PPS resin mainly composed of a linear type PPS resin is used, silica particles are contained at a ratio in the range of 45% to 65% by weight in the resin composition. These silica particles have an average particle size, particle size distribution, and form similar to those of the silica particles mentioned above. If the silica particle content is less than 45% by weight, the coefficient of linear expansion and the anisotropy will increase, thereby lowering the dimensional precision; whereas, if the silica particle content exceeds 65% by weight, the fluidity of the resin composition at the time of molding decreases, so as to deteriorate the moldability, thereby lowering the dimensional precision. Also, since the ratio of the PPS resin decreases, the optical fiber positioning member becomes brittle.

Also, the resin composition contains silicate whiskers at a ratio in the range of 3% to 13% by weight. If it is less than 3% by weight, the reinforcing effects caused by the silicate whiskers will be insufficient, whereby the mechanical strength will be smaller; whereas, if it exceeds 13% by weight, the fluidity of the resin composition at the time of molding will decrease, and the dimensional precision and mechanical strength will lower.

Further, the total content of the silica particles and silicate whiskers contained in the resin composition is 58% to 78% by weight. If the total content is less than 58% by weight, the dimensional precision of the optical fiber positioning member will lower; whereas, if the total content exceeds 78% by weight, the fluidity of the resin composition at the time of molding will worsen, so as to deteriorate the moldability, thereby lowering the dimensional precision and making the mechanical strength insufficient.

While the resin composition used in the present invention is constituted by a thermoplastic resin, silica particles, and calcium silicate whiskers; fine fillers other than the silica particles and whiskers, pigments, stabilizers, coupling agents, flame retardants, and the like may also be added thereto in such ranges that the aimed performances are not lost.

Though the resin composition used in the present invention can be kneaded according to a normal kneading method for compounding fillers into the resin composition, it is preferred that a kneading apparatus having high kneading effects adapted to fully disperse fillers and other compounding materials into the resin composition be used for kneading. Examples of such a kneading apparatus include uniaxial or biaxial extruders, kneaders, and the like.

Examples of the optical fiber positioning member of the present invention include a ferrule and a sleeve, which are applicable to various kinds of optical connectors such as MT optical connectors, MPO optical connectors, and the like which will be explained in the following.

Figure 1:
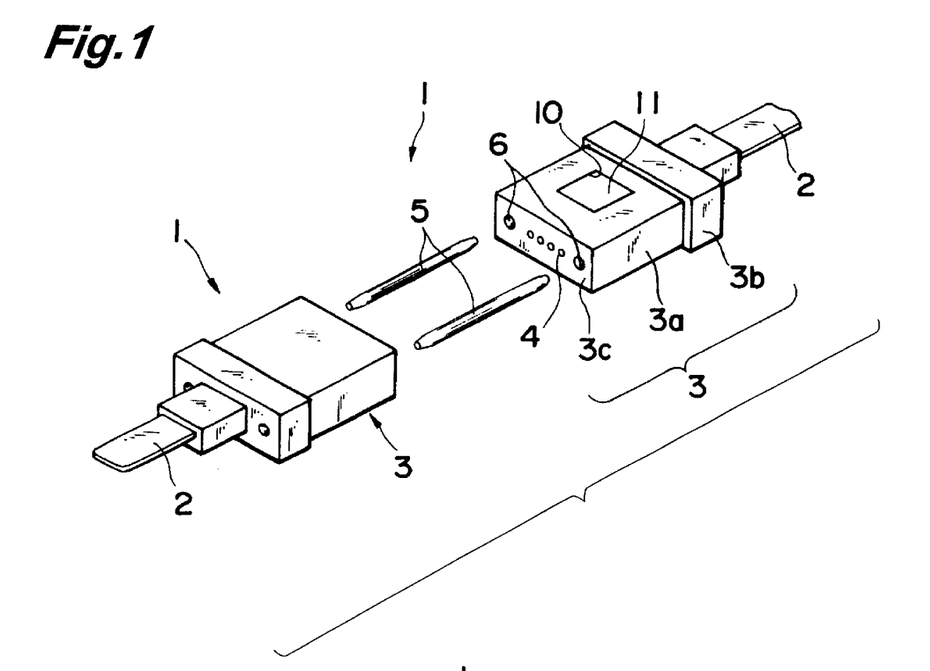
FIG. 1 is a perspective view showing the state before coupling of MT optical connectors each employing a ferrule as the optical fiber positioning member of the present invention.
Figure 2:
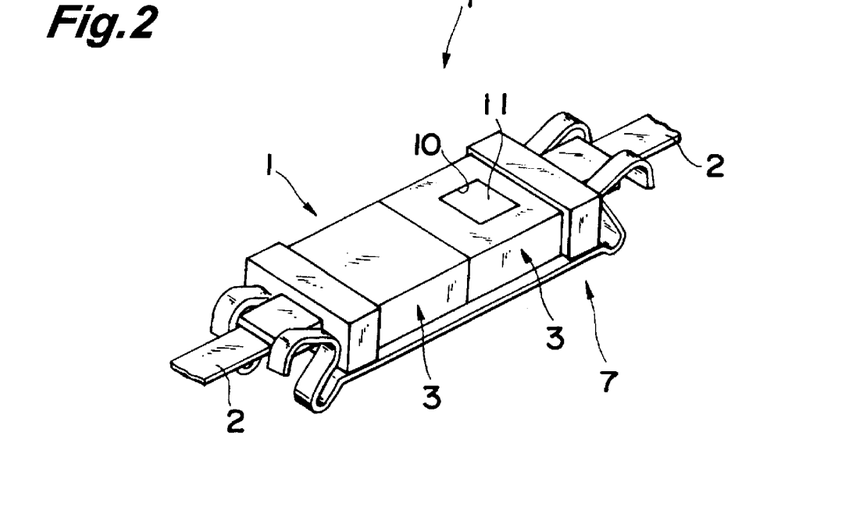
FIG. 2 is a perspective view showing the state after coupling of MT optical connectors each employing a ferrule as the optical fiber positioning member of the present invention.

FIG. 1 is a perspective view showing MT optical connectors each employing a multichannel ferrule as the optical fiber positioning member, indicating the state before multichannel connectors are connected to each other. FIG. 2 is a perspective view showing the MT optical connectors after the multichannel ferrules of FIG. 1 are connected to each other. As shown in FIG. 1, the MT optical connectors 1 comprise one set of ferrules 3 for securing coated optical fibers, a pair of rod-shaped guide pins 5, 5 to be inserted into the ferrules 3, 3 for connecting the ferrules 3, 3 to each other, and a connecting clip 7 for connecting the ferrules 3, 3 butted against each other. The ferrule 3 comprises a planar connecting portion 3a, and a block-shaped fiber inserting portion 3b integrally formed at one end of the connecting portion 3a. For example, a 4-fiber ribbon 2 is inserted into the fiber inserting portion 3b, whereas four optical fibers 4 exposed by peeling off the coating of the ribbon fiber 2 at a front end portion thereof are accommodated in the connecting portion 3a. Also, in the connecting portion 3a a window hole 10 is formed, through which an adhesive 11 made of an epoxy resin or the like is injected, so as to secure the coated optical fibers 4. Further, in the ferrule 3 guide holes 6, 6 are formed, each of which has a substantially circular inner periphery, to fit a pair of guide pins 5, 5.

Figure 3:
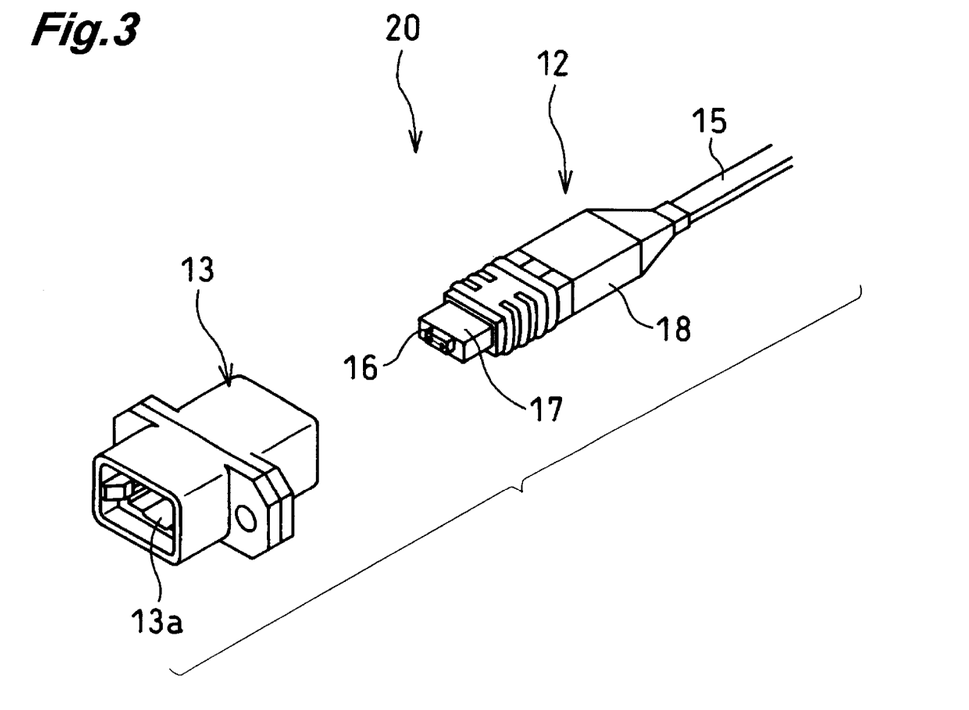
FIG. 3 is a perspective view showing an MPO optical connector employing a ferrule as the optical fiber positioning member of the present invention.
Figure 4:
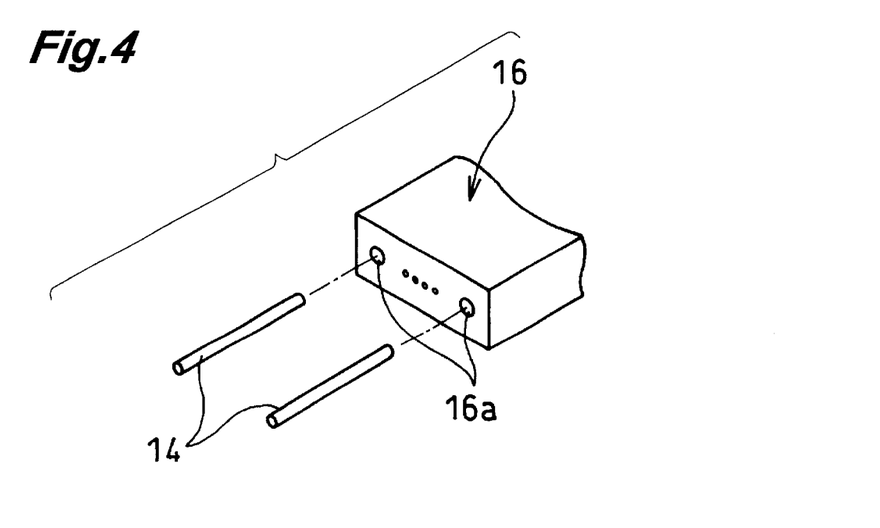
FIG. 4 is an enlarged perspective view showing the ferrule of FIG. 3.

FIG. 3 is a perspective view showing an MPO optical connector employing a ferrule as the optical fiber positioning member of the present invention, whereas FIG. 4 is an enlarged view showing the ferrule of FIG. 3. As shown in FIGS. 3 and 4, the MPO optical connectors 20 comprises a pair of plugs 12, an adapter 13 having a guide hole 13a for guiding and accommodating these plugs 12, and a pair of guide pins 14, 14 used for connecting the plugs 12 to each other. The plug 12 is constituted by a ferrule 16 for securing a front end portion of a fiber ribbon 15, a ferrule securing member 17 for accommodating this ferrule 16 therein, and a cover 18 for accommodating this ferrule securing member 17 therein; whereas the ferrule 16 has a configuration identical to that of the ferrule 3 in the MT optical connector 1. Hence, in the ferrule 16 a pair of guide holes 16a, 16a are formed such that the guide pins 14 are inserted thereto. In such an MPO optical connector 20, since the guide pin 14 may be inserted into the guide hole 16a while being shifted or tilted with respect thereto, a high mechanical strength is required in the ferrule 16. Consequently, the ferrule 16 as the positioning member of the present invention is also suitable for the MPO optical connector 20.

In the following, the present invention will be explained in further detail with reference to Examples.

EXAMPLES

As the optical fiber positioning member, a ferrule to be used in an MT optical connector was made. For making the ferrule, a PPS resin (IPC-1 manufactured by Idemitsu Petrochemical Co., Ltd.), silica particles, and whiskers were initially prepared. Subsequently, the PPS resin, silica particles, and whiskers were mixed, and the resulting mixture was fed to a biaxial extruder (PCM-45 manufactured by Ikegai Corp.) and melted and kneaded therein, whereby a pellet-like resin composition was obtained. Then, this pellet-like resin composition was molded by using a horizontal injection molding machine with a clamping force of 30 t, whereby a 4-core ferrule (having dimensions of about 6 mm×8 mm×2.5 mm) such as those shown in FIGS. 1 to 3 was obtained. Here, the diameter of the guide hole formed in the ferrule was set to 700 μm. The dimensional precision, dimensional stability, mechanical strength, and long-term durability of this ferrule were evaluated as follows.

Namely, the dimensional precision of the ferrule was evaluated by the roundness and the connection loss of MT optical connectors. Here, the MT optical connectors were prepared as follows. Namely, a pair of ferrules and two 4-single-mode-fiber ribbons were prepared, the fiber ribbons were secured to the respective ferrules with an adhesive, and the end faces of the fiber ribbons were ground. Then, a pair of guide pins were used for connecting the ferrules to each other, thus preparing the MT optical connectors.

The connection loss of the MT optical connectors was determined by introducing laser light having a wavelength of 1.3 μm into one fiber ribbon by use of a laser diode (regulated light source AQ-4139 manufactured by Ando Electric Co., Ltd.) and detecting the light emitted from the other fiber ribbon by a power meter (optical power meter AQ-1135E manufactured by Ando Electric Co., Ltd.). Also, "roundness" was determined by the difference between the maximum inside diameter and the minimum inside diameter measured by a stylus type roundness meter at a position 1 mm of the end of the guide hole of the ferrule.

The mechanical strength of the ferrule was evaluated by "breaking strength." Here, the "breaking strength" means a load at which the guide pin hole 6 breaks when one end of a stainless guide pin having a length of 11 mm is inserted therein by about 1 mm and the load is applied at a velocity of 0.1 mm/second to deform the guide pin at a position 4 mm of the other end of the guide pin.

The dimensional stability of the ferrule was evaluated by measuring the changes in connection loss before and after a heat cycle test from −40° C. to 75° C.

The long-term durability of the ferrule was evaluated by repeating attachment and detachment of the optical connectors 250 times and measuring the changes in connection loss of the MT optical connectors therebefore and thereafter.

Here, each of the measurements of optical connector connection loss, connection loss change due to repeated attachment and detachment, and connection loss change before and after the heat cycle test was carried out for 10 optical connectors, so as to determine the average value thereof. Also, each of the measurements of the roundness of the guide hole of the ferrule and the breaking strength was carried out for 5 optical connectors, so as to determine the average value thereof.

Example 1

Fused silica particles (SCM QZ fused, manufactured by Izumitech Co., Ltd.) having an average particle size of 0.5 μm were prepared as silica particles, and calcium silicate whiskers (FPW400 manufactured by Kinsei Matec Co., Ltd.) having an average fiber length of 8 μm and an average diameter of 2 μm were prepared as whiskers. The PPS resin, silica particles, and calcium silicate whiskers were mixed at their respective contents shown in Table 1, whereby ferrules for MT connectors were made. Concerning the ferrules, the optical connector connection loss, roundness, breaking strength, connection loss change due to repeated attachment and detachment, and connection loss change before and after the heat cycle test were measured. The results are shown in Table 1.

TABLE 1

| | Contents (% by weight) in resin composition | | | | | | | Evaluation of ferrule (optical connector) | | | | |
|---|---|---|---|---|---|---|---|---|---|---|---|---|
| | PPS resin | Silica particles | Calcium silicate whiskers | Zinc oxide whiskers | Potassium titanate whiskers | Total whiskers | Silica particles + whiskers | Glass fibers | Optical connector connection loss (dB) | Round-ness (μm) | Breaking strength (gf) | Connection loss change in heat cycle test (dB) | Connection loss change in repeated attachment/detachment (dB) |
| Ex. 1 | 20 | 50*1 | 30 | — | — | 30 | 80 | — | 0.28 | 0.8 | 650 | 0.3 or less | 0.3 or less |
| Ex. 2 | 23 | 50*1 | 17 | 10 | — | 27 | 77 | — | 0.25 | 0.6 | 600 | 0.3 or less | 0.3 or less |
| Ex. 3 | 19 | 54*2 | 27 | — | — | 27 | 81 | — | 0.25 | 0.6 | 600 | 0.3 or less | 0.3 or less |
| Ex. 4 | 18 | 52*2 | 20 | 10 | — | 30 | 82 | — | 0.22 | 0.5 | 500 | 0.3 or less | 0.3 or less |
| Ex. 5 | 22 | 49*4 | 29 | — | — | 29 | 78 | — | 0.25 | 0.7 | 650 | 0.3 or less | 0.3 or less |
| Ex. 6 | 25 | 46*1 | 29 | — | — | 29 | 75 | — | 0.30 | 0.9 | 650 | 0.3 or less | 0.3 or less |
| Ex. 7 | 31 | 62*4 | 7 | — | — | 7 | 69 | — | 0.25 | 0.3 | 500 | 0.3 | 0.3 |
| Comp. Ex 1 | 22 | 60*3 | — | 18 | — | 18 | 78 | — | 0.22 | 0.5 | 300 | 0.4 | 1.0 |
| Comp. Ex 2 | 30 | 40*3 | — | — | — | — | — | 30 | 1.0 | 2.2 | 700 | 1.0 | 0.4 |
| Comp. Ex 3 | 25 | 53*4 | 22 | — | — | 22 | 75 | — | 0.25 | 0.7 | 350 | 0.5 | 1.0 |
| Comp. Ex 4 | 22 | 56*4 | 22 | — | — | 22 | 78 | — | 0.25 | 0.5 | 350 | 0.5 | 1.0 |
| Comp. Ex 5 | 26 | 59*1 | 15 | — | — | 15 | 74 | — | 0.22 | 0.5 | 350 | 0.4 | 1.0 |
| Comp. Ex 6 | 12 | 49*4 | 39 | — | — | 39 | 88 | — | 0.8 | 1.4 | 400 | 0.8 | 0.8 |
| Comp. Ex 7 | 25 | 48*1 | — | — | 27 | 27 | 75 | — | 0.7 | 1.0 | 500 | 0.8 | 0.8 |

*1 silica particles having an average particle size of 0.5 μm
*2 silica particles having two relative maximum values at 0.3 μm and 4.5 μm, respectively, in their particle size distribution
*3 silica particles having an average particle size of 4.5 μm
*4 silica particles having two relative maximum values at 0.5 μm and 4.5 μm, respectively, in their particle size distribution Example 2

Ferrules for MT connectors were made in a manner similar to Example 1 except that the PPS resin, silica particles, and calcium silicate whiskers were mixed at their respective contents shown in Table 1, and that zinc oxide whiskers (Pana-Tetra manufactured by Matsushita Amtec Co., Ltd.) were further mixed at the content shown in Table 1. Here, the zinc oxide whiskers have a tetrapod form, while four needle-like portions extending from its center each have an average length of 30 μm and an average diameter of 3 μm. Concerning the ferrules, as in Example 1, the optical connector connection loss, roundness, breaking strength, connection loss change due to repeated attachment and detachment, and connection loss change before and after the heat cycle test were measured. The results are shown in Table 1.

Example 3

Ferrules for MT connectors were made in a manner similar to Example 1 except that the PPS resin, silica particles, and calcium silicate whiskers were mixed at their respective contents shown in Table 1, and that, the silica particles had two relative maximum values, at 0.3 μm and 4.5 μm, in their particle size distribution. The silica particles were prepared by mixing different kinds of silica particles (SCM QZ fused, manufactured by Izumitech Co., Ltd.). Further, the weight ratio of the silica particles exhibiting these two relative maximum values was 1.4. Concerning the ferrules, as in Example 1, the optical connector connection loss, roundness, breaking strength, connection loss change due to repeated attachment and detachment, and connection loss change before and after the heat cycle test were measured. The results are shown in Table 1.

Example 4

Ferrules were made in a manner similar to Example 3 except that the PPS resin, silica particles, and calcium silicate whiskers were mixed at their respective contents shown in Table 1, and that zinc oxide whiskers similar to those in Example 2 were mixed at the content shown in Table 1. Concerning the ferrules, as in Example 1, the optical connector connection loss, roundness, breaking strength, connection loss change due to repeated attachment and detachment, and connection loss change before and after the heat cycle test were measured. The results are shown in Table 1.

Example 5

Ferrules were made in a manner similar to Example 1 except that the PPS resin, silica particles, and calcium silicate whiskers were mixed at their respective contents shown in Table 1, and that, the silica particles had two relative maximum values at 0.5 μm and 4.5 μm, in their particle size distribution. Concerning the ferrules, as in Example 1, the optical connector connection loss, roundness, breaking strength, connection loss change due to repeated attachment and detachment, and connection loss change before and after the heat cycle test were measured. The results are shown in Table 1.

Example 6

Ferrules were made in a manner similar to Example 1 except that the PPS resin, silica particles, and calcium silicate whiskers were mixed at their respective contents shown in Table 1. Concerning the ferrules, as in Example 1, the optical connector connection loss, roundness, breaking strength, connection loss change due to repeated attachment and detachment, and connection loss change before and after the heat cycle test were measured. The results are shown in Table 1.

Example 7

Ferrules were made in a manner similar to Example 5 except that the PPS resin, silica particles, and calcium silicate whiskers were mixed at their respective contents shown in Table 1. Concerning the ferrules, as in Example 1, the optical connector connection loss, roundness, breaking strength, connection loss change due to repeated attachment and detachment, and connection loss change before and after the heat cycle test were measured. The results are shown in Table 1.

Comparative Example 1

Ferrules for MT connectors were made in a manner similar to Example 4 except that the PPS resin, silica particles, and zinc oxide whiskers were mixed at their respective contents shown in Table 1, that, the silica particles had an average particle size of 4.5 $\mu$m, and that no calcium silicate whisker was mixed therewith. Concerning the ferrules, as in Example 1, the optical connector connection loss, roundness, breaking strength, connection loss change due to repeated attachment and detachment, and connection loss change before and after the heat cycle test were measured. The results are shown in Table 1. As shown in Table 1, it was seen that the breaking strength was as low as about one half that of the ferrules of Examples 1 to 7.

Comparative Example 2

Ferrules were made in a manner similar to Example 1 except that the PPS resin and silica particles were mixed at their respective contents shown in Table 1, that, the silica particles had an average particle size of 4.5 $\mu$m, and that glass fibers were mixed therewith in place of the calcium silicate whiskers. The glass fibers had a fiber length of 70 $\mu$m or less and were obtained by crushing glass fibers having an average fiber diameter of 13 $\mu$m (MAFT104 manufactured by Asahi Fiber Glass Co., Ltd.). Concerning the ferrules, as in Example 1, the optical connector connection loss, roundness, breaking strength, connection loss change due to repeated attachment and detachment, and connection loss change before and after the heat cycle test were measured. The results are shown in Table 1. As shown in Table 1, it was seen that, though the breaking strength became greater than that of the ferrules of Examples 1 to 7, both of the optical connector connection loss and roundness became greater, and the dimensional precision lowered.

Comparative Example 3

Ferrules were made in a manner similar to Example 5 except that the PPS resin, silica particles, and calcium silicate whiskers were mixed at their respective contents shown in Table 1. Concerning the ferrules, as in Example 1, the optical connector connection loss, roundness, breaking strength, connection loss change due to repeated attachment and detachment, and connection loss change before and after the heat cycle test were measured. The results are shown in Table 1. As shown in Table 1, it was seen that the breaking strength was as low as about one half that of the ferrules of Examples 1 to 7.

Comparative Example 4

Ferrules were made in a manner similar to Example 5 except that the PPS resin, silica particles, and calcium silicate whiskers were mixed at their respective contents shown in Table 1. Concerning the ferrules, as in Example 1, the optical connector connection loss, roundness, breaking strength, connection loss change due to repeated attachment and detachment, and connection loss change before and after the heat cycle test were measured. The results are shown in Table 1. As shown in Table 1, it was seen that the breaking strength was as low as about one half that of the ferrules of Examples 1 to 7.

Comparative Example 5

Ferrules were made in a manner similar to Example 1 except that the PPS resin, silica particles, and calcium silicate whiskers were mixed at their respective contents shown in Table 1. Concerning the ferrules, as in Example 1, the optical connector connection loss, roundness, breaking strength, connection loss change due to repeated attachment and detachment, and connection loss change before and after the heat cycle test were measured. The results are shown in Table 1. As shown in Table 1, it was seen that the breaking strength was as low as about one half that of the ferrules of Examples 1 to 7.

Comparative Example 6

Ferrules were made in a manner similar to Example 5 except that the PPS resin, silica particles, and calcium silicate whiskers were mixed at their respective contents shown in Table 1. Concerning the ferrules, as in Example 1, the optical connector connection loss, roundness, breaking strength, connection loss change due to repeated attachment and detachment, and connection loss change before and after the heat cycle test were measured. The results are shown in Table 1. As shown in Table 1, it was seen that the breaking strength was lower than that of the ferrules of Examples 1 to 7. Also, since a large amount of calcium silicate whiskers were contained therein, the resin fluidity at the time of molding was unfavorable, whereby a favorable dimensional precision was not obtained.

Comparative Example 7

Ferrules for MT connectors were made in a manner similar to Example 1 except that, in place of the calcium silicate whiskers, potassium titanate whiskers having a form identical thereto were used, and that the PPS resin, silica particles, and potassium titanate whiskers were mixed at their respective contents shown in Table 1. The potassium titanate had an average diameter of 1 $\mu$m and an average length of 10 $\mu$m (product name: Tismo, manufactured by Otsuka Chemical Co., Ltd.). Concerning the ferrules, as in Example 1, the optical connector connection loss, roundness, breaking strength, connection loss change due to repeated attachment and detachment, and connection loss change before and after the heat cycle test were measured. The results are shown in Table 1. When potassium titanates were contained by an amount equivalent to that of calcium silicate in Example 1, the resin fluidity at the time of molding worsened, whereby favorable characteristics were not obtained in the molded ferrules. Namely, as shown in Table 1, it was seen that both of the optical connector connection loss and roundness were greater than those of the ferrules of Examples 1 to 7, and the dimensional precision lowered. Also, favorable results were not obtained in the heat cycle test and repeating attachment and detachment test, whereas the dimensional stability and long-term durability of the ferrules were not better than those in Examples 1 to 7.

Industrial Applicability

In accordance with the optical fiber positioning member of the present invention, as explained in the foregoing, since the silica particles and silicate whiskers are contained in the resin composition, the mechanical strength of the optical fiber positioning member can be made greater as compared with the cases where other kinds of whiskers are employed, while the dimensional precision and dimensional stability of the optical fiber positioning member are maintained, and the long-term durability can be improved as well.

What is claimed is:

1. An optical fiber positioning member comprising a resin composition containing a polyphenylene sulfide resin at a ratio in the range of 15% to 35% by weight, silica particles at a ratio in the range of 45% to 65% by weight, and silicate whiskers at a ratio in the range of 26% to 35% by weight, said resin composition containing said silica particles and said silicate whiskers at a ratio in the range of 65% to 85% by weight, wherein said silica whiskers are calcium silicate whiskers or potassium silicate whiskers, have an average fiber length of 3 to 50 $\mu$m, have an average diameter of 1 to 10 $\mu$m and have an aspect ratio of 3 to 10.

2. An optical fiber positioning member according to claim 1, wherein said silica particles have a particle size distribution with at least one relative maximum value located within a particle size range of 0.3 to 0.9 $\mu$m.

3. An optical fiber positioning member according to claim 1, wherein said silica particles have a particle size distribution with one relative maximum value located within a particle size range of 0.3 to 0.9 $\mu$m.

4. An optical fiber positioning member according to claim 1, wherein said silica particles have two relative maximum values in a particle size distribution thereof, and wherein the ratio of particle sizes corresponding to said two relative maximum values is 4 to 40.

5. An optical fiber positioning member comprising a resin composition containing a polyphenylene sulfide resin at a ratio in the range of 15% to 35% by weight, silica particles at a ratio in the range of 45% to 65% by weight, and silicate whiskers at a ratio in the range of 26% to 35% by weight, said resin composition containing said silica particles and said silicate whiskers at a ratio in the range of 65% to 85% by weight, wherein said silica particles have a plurality of relative maximum values in a particle size distribution thereof, and wherein the weight ratio of silica particles exhibiting the two largest relative values is 1 to 1.9.

6. An optical fiber positioning member comprising a resin composition containing a polyphenylene sulfide resin at a ratio in the range of 15% to 35% by weight, silica particles at a ratio in the range of 45% to 65% by weight, and silicate whiskers at a ratio in the range of 26% to 35% by weight, said resin composition containing said silica particles and said silicate whiskers at a ratio in the range of 65% to 85% by weight, wherein said silica particles are constituted by silica particles having different forms.

7. An optical fiber positioning member comprising a resin composition containing a polyphenylene sulfide resin, silica particles, and a plurality of whisker types including silicate whiskers, the content of said silicate whiskers in said resin composition is 26% to 35% by weight, wherein the silicate whiskers are calcium silicate whiskers or potassium silicate whiskers, have an average fiber length of 3 to 50 $\mu$m, have an average diameter of 1 to 10 $\mu$m and have an aspect ratio of 3 to 10.

8. An optical fiber positioning member according to claim 7, wherein said whiskers contain at least silicate whickers and zinc oxide whiskers.

9. An optical fiber positioning member comprising a resin composition containing a polyphenylene sulfide resin, silica particles, and a plurality of whisker types including silicate whiskers, wherein:
said whiskers contain at least silicate whiskers and zinc oxide whiskers; and
the content of said silicate whiskers is 5% to 30% by weight and the content of said zinc oxide whiskers is 5% to 30% by weight in said resin composition.

10. An optical fiber positioning member according to claim 7, wherein said silica particles have a particle size distribution with at least one relative maximum value located within a particle size range of 0.3 to 0.9 $\mu$m.

11. An optical fiber positioning member according to one of claims claim 7, wherein said silica particles have a particle size distribution with one relative maximum value located within a particle size range of 0.3 to 0.9 $\mu$m.

12. An optical fiber positioning member according to one of claims claim 7, wherein said silica particles have two relative maximum values in a particle size distribution thereof, and wherein the ratio of particle sizes corresponding to said two relative maximum values is 4 to 40.

13. An optical fiber positioning member comprising a resin composition containing a polyphenylene sulfide resin, silica particles, and a plurality of whisker types including silicate whiskers, wherein said silica particles have a plurality of relative maximum values in a particle size distribution thereof, and wherein the weight ratio of said silica particles exhibiting the two largest relative maximum values is 1 to 1.9.

14. An optical fiber positioning member comprising a resin composition containing a polyphenylene sulfide resin, silica particles, and a plurality of whisker types including silicate whiskers, wherein said silica particles are constituted by silica particles having different forms.

15. An optical fiber positioning member comprising a resin composition containing a polyphenylene sulfide resin mainly composed of a linear type polyphenylene sulfide resin at a ratio in the range of 22% to 35% by weight, silica particles at a ratio in the range of 45% to 65% by weight, and silicate whiskers at a ratio in the range of 3% to 13% by weight, said resin composition containing said silica particles and said silicate whiskers at a ratio in the range of 58% to 78% by weight. wherein the silicate whiskers are calcium silicate whiskers or potassium silicate whiskers, have an average fiber length of 3 to 50 $\mu$m, have an average diameter of 1 to 10 $\mu$m and have an aspect ratio of 3 to 10.

16. An optical fiber positioning member according to claim 15, wherein said silica particles have a particle size distribution with at least one relative maximum value located within a particle size range of 0.3 to 0.9 $\mu$m.

17. An optical fiber positioning member according to claim 15, wherein said silica particles have a particle size distribution with one relative maximum value located within a particle size range of 0.3 to 0.9 $\mu$m.

18. An optical fiber positioning member according to claim 15, wherein said silica particles have two relative maximum values in a particle size distribution thereof, and wherein the ratio of particle sizes corresponding to the said relative maximum values is 4 to 40.

19. An optical fiber positioning member comprising a resin composition containing a polyphenylene sulfide resin mainly composed of a linear type polyphenylene sulfide resin at a ratio in the range of 22% to 35% by weight, silica particles at a ratio in the range of 45% to 65% by weight, and silicate whiskers at a ratio in the range of 3% to 13% by weight, said resin composition containing said silica particles and said silicate whiskers at a ratio in the range of 58% to 78% by weight, wherein said silica particles have a plurality of relative maximum values in particle size distribution thereof, and wherein the weight ratio of silica particles exhibiting the two largest relative maximum values is 1 to 1.9.

20. An optical fiber positioning member comprising a resin composition containing a polyphenylene sulfide resin mainly composed of a linear type polyphenylene sulfide resin at a ratio in the range of 22% to 35% by weight, silica particles at a ratio in the range of 45% to 65% by weight, and silicate whiskers at a ratio in the range of 3% to 13% by weight, said resin composition containing said silica particles and said silicate whiskers at a ratio in the range of 58% to 78% by weight, wherein said silica particles are constituted by silica particles having different forms.

21. A MT optical connector employing an optical fiber positioning member according to claim 1.

22. A MPO optical connector employing an optical fiber positioning member according to claim 1.

23. An optical fiber positioning member according to claim 5, wherein the silicate whiskers are calcium silicate whiskers or potassium silicate whiskers, have an average fiber length of 3 to 50 $\mu$m, have an average diameter of 1 to 10 $\mu$m and have an aspect ratio of 3 to 10.

24. An optical fiber positioning member according to claim 6, wherein the silicate whiskers are calcium silicate whiskers or potassium silicate whiskers, have an average fiber length of 3 to 50 $\mu$m, have an average diameter of 1 to 10 $\mu$m and have an aspect ratio of 3 to 10.

25. An optical fiber positioning member according to claim 9, wherein the silicate whiskers are calcium silicate whiskers or potassium silicate whiskers, have an average fiber length of 3 to 50 $\mu$m, have an average diameter of 1 to 10 $\mu$m and have an aspect ratio of 3 to 10.

26. An optical fiber positioning member according to claim 13, wherein the silicate whiskers are calcium silicate whiskers or potassium silicate whiskers, have an average fiber length of 3 to 50 $\mu$m, have an average diameter of 1 to 10 $\mu$m and have an aspect ratio of 3 to 10.

27. An optical fiber positioning member according to claim 14, wherein the silicate whiskers are calcium silicate whiskers or potassium silicate whiskers, have an average fiber length of 3 to 50 $\mu$m, have an average diameter of 1 to 10 $\mu$m and have an aspect ratio of 3 to 10.

28. An optical fiber positioning member according to claim 19, wherein the silicate whiskers are calcium silicate whiskers or potassium silicate whiskers, have an average fiber length of 3 to 50 $\mu$m, have an average diameter of 1 to 10 $\mu$m and have an aspect ratio of 3 to 10.

29. An optical fiber positioning member according to claim 20, wherein the silicate whiskers are calcium silicate whiskers or potassium silicate whiskers, have an average fiber length of 3 to 50 $\mu$m, have an average diameter of 1 to 10 $\mu$m and have an aspect ratio of 3 to 10.

* * * * *